United States Patent [19]

Garman et al.

[11] Patent Number: 4,815,191
[45] Date of Patent: Mar. 28, 1989

[54] PIVOT JOINT ASSEMBLY

[75] Inventors: Anthony L. Garman, Benton Harbor; Charles R. Sturtz, Jr., Stevensville, both of Mich.

[73] Assignee: VME Americas Inc., Cleveland, Ohio

[21] Appl. No.: 5,010

[22] Filed: Jan. 20, 1987

Related U.S. Application Data

[62] Division of Ser. No. 695,011, Jan. 25, 1985, abandoned.

[51] Int. Cl.$^4$ .............................................. B23P 11/00
[52] U.S. Cl. ...................................... 29/434; 29/525.1; 403/162; 403/158
[58] Field of Search .............. 29/526 R, 434, 148.4 A; 414/722, 723; 403/158, 157, 156, 154, 161, 162; 384/585, 562

[56] References Cited

U.S. PATENT DOCUMENTS

| | | | |
|---|---|---|---|
| 1,926,403 | 9/1933 | Phillips | 384/585 |
| 2,230,045 | 1/1941 | Boden | 384/562 X |
| 3,009,747 | 11/1961 | Pitzer | 403/243 X |
| 4,243,341 | 1/1981 | Kabay et al. | 403/16 |
| 4,333,695 | 6/1982 | Evans | 384/562 |
| 4,507,005 | 3/1985 | Siewert et al. | 403/16 |
| 4,652,167 | 3/1987 | Gorman | 403/16 X |

Primary Examiner—Andrew V. Kundrat
Attorney, Agent, or Firm—Watts, Hoffmann, Fisher & Heinke Co.

[57] ABSTRACT

A pivot joint mechanism for connecting together two relatively movable members which includes a stepped opening through one of such members in the form of an inwardly extending flange at one end of such opening, an intermediate section, and a threaded section at the opposite end of said opening. A retainer ring threaded into said threads captures a bearing mechanism between said retainer ring and said flange.

8 Claims, 2 Drawing Sheets

PIVOT JOINT ASSEMBLY

This application is a division, of application Ser. No. 695,011, filed Jan. 25, 1985 now abandoned.

CROSS REFERENCE

This application is related to U.S. Pat. No. 4,652,167, dated Mar. 24, 1987, in that a portion of the disclosure is common to both.

BACKGROUND OF THE INVENTION

1. Field of the Invention

This invention relates to pivot joint mechanisms for connecting together two relatively movable members which form part of a machine. It is particularly useful in earthworking machinery but is not limited to such use.

2. Description of the Prior Art

U.S. patent application Ser. No. 06/553,456 Siewert et al filed Nov. 21, 1983, now U.S. Pat. No. 4,507,005, dated Mar. 26, 1985, shows a pivot joint mechanism which employs a pair of cone-type locks at the respective ends of a pivot pin, which can be readily assembled to hold internal parts in place. Each cone-type lock includes an inner male member and an outer female member and both locks can be locked by means of a single bolt extending through a bore in the pin and a nut on such bolt. U.S. Pat. No. 4,243,341 Kabay et al shows a pivot joint that includes a stepped diameter pin, one end of which is fastened to one of the structural members and the other end of which is received in an end cap that serves to preload a tapered roller bearing assembly mounted on the other structural member.

SUMMARY OF THE INVENTION

The pivot joint bearing retainment mechanism of the present invention includes a stepped opening through an inner structural member, with the section of least diameter forming an inwardly extending flange at one end of the opening. There is an intermediate section of the opening having a cylindrical wall. At the other end of the stepped opening the portion of largest diameter is threaded. A retainer and at least one bearing member are captured between the flange at one end and a retainer ring threaded into the threads at the other end of the opening.

DESCRIPTION OF THE PREFERRED EMBODIMENTS

Figure 1:
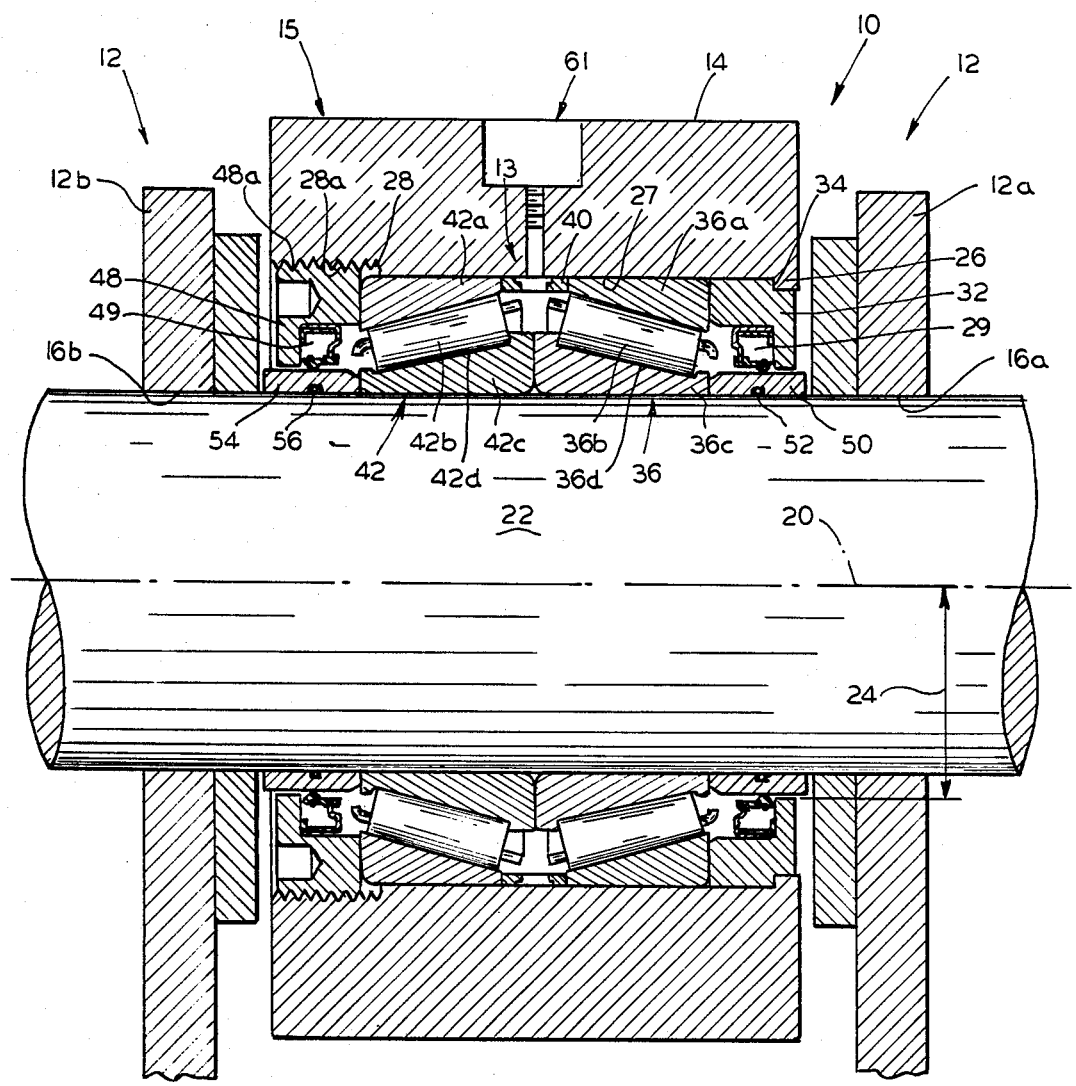
FIG. 1 of the drawing shows an axial sectional view, in section except for the pin, of a pivot joint bearing retainer mechanism according to the present invention.

FIG. 1 of the drawing shows a bearing retainer mechanism 10 in accordance with the present invention pivotally connecting two relatively movable members 12 and 14 to form a pivot joint 15. Member 12 is bifurcated and includes two spaced apart flanges 12a and 12b which may be part of a bracket on a loader bucket. The other member 14 is a housing which is located in part between flanges 12a and 12b, and may be connected to a bellcrank which pivots the bucket. Each of the flanges 12a and 12b and housing 14 has a circular opening therethrough, indicated by the numerals 16a and 16b respectively for the two flanges and the numeral 13 for a stepped opening through housing 14, with the centers of such openings coinciding along an axis 20 extending transversely to planes coinciding with said movable members.

The stepped opening 13 through housing 14 includes an inwardly extending flange 26 at one end, an intermediate diameter section 27, and a third larger diameter section 28 which is threaded. When assembled the joint 15 includes a retainer ring 32 having a shoulder portion 34 which abuts flange 26; this retainer ring carries a dynamic seal 29. A bearing assembly 36 has an outer race or cup 36a which abuts retainer ring 32 and a cone assembly 36d which is inclusive of rollers 36b and cone 36c. A spacer 40 abuts race 36a. The outer race or cup 42a of bearing assembly 42 abuts spacer 40, and a retainer ring 48 abuts race 42a. Bearing assembly 42 also includes a cone assembly 42d which is inclusive of rollers 42b and cone 42c. Retainer ring 48 has an external threaded portion 48a which mates with an internal threaded portion 28a in housing 14, and carries a dynamic seal 49. Both seals 29 and 49 are pressed in place prior to the assembly of this bearing retainer mechanism as described below.

A cylindrical pivot pin 22, which is the principal structural member of the pivot joint 15, is located within openings 16a, 13 and 16b coaxially with axis 20, and is the part on which housing 14 is journaled for oscillatory pivotal movement.

In assembling a pivot joint in accordance with this invention the first steps are done with the housing 14 separate from flanges 12a and 12b. The first step is to insert retainer ring 32 into opening 13 until shoulder 34 on the retainer ring abuts flange 26. Then, in order, the outer race 36a of bearing 36, the cone assembly 36d, the spacer 40, the cone assembly 42d of bearing 42, and the outer race 42a of bearing 42 are assembled in housing 14. Then retainer ring 48 which has external threads 48a to mate with the threads 28a on section 28 is assembled to retain the bearings and related parts in place and to preload the bearings.

Next spacers 50 and 54 which carry seals 52 and 56 respectively are inserted through seals 29 and 49 respectively until said spacers abut cones 36c and 42c respectively. Housing 14 with the bearing retainer mechanism 10 and and bearings assembled on it along with spacers 50 and 54 is aligned so that the axis of opening 13 is coaxial with axis 20 and thus is coaxial with openings 16a and 16b in bifurcated frame member 12. Pin 22 is then inserted through members 12a, 14 and 12b respectively and can be secured to either 12a or 12b or both by any retention method desired to keep the pin from turning and axially lock the pin in place.

Figure 2:
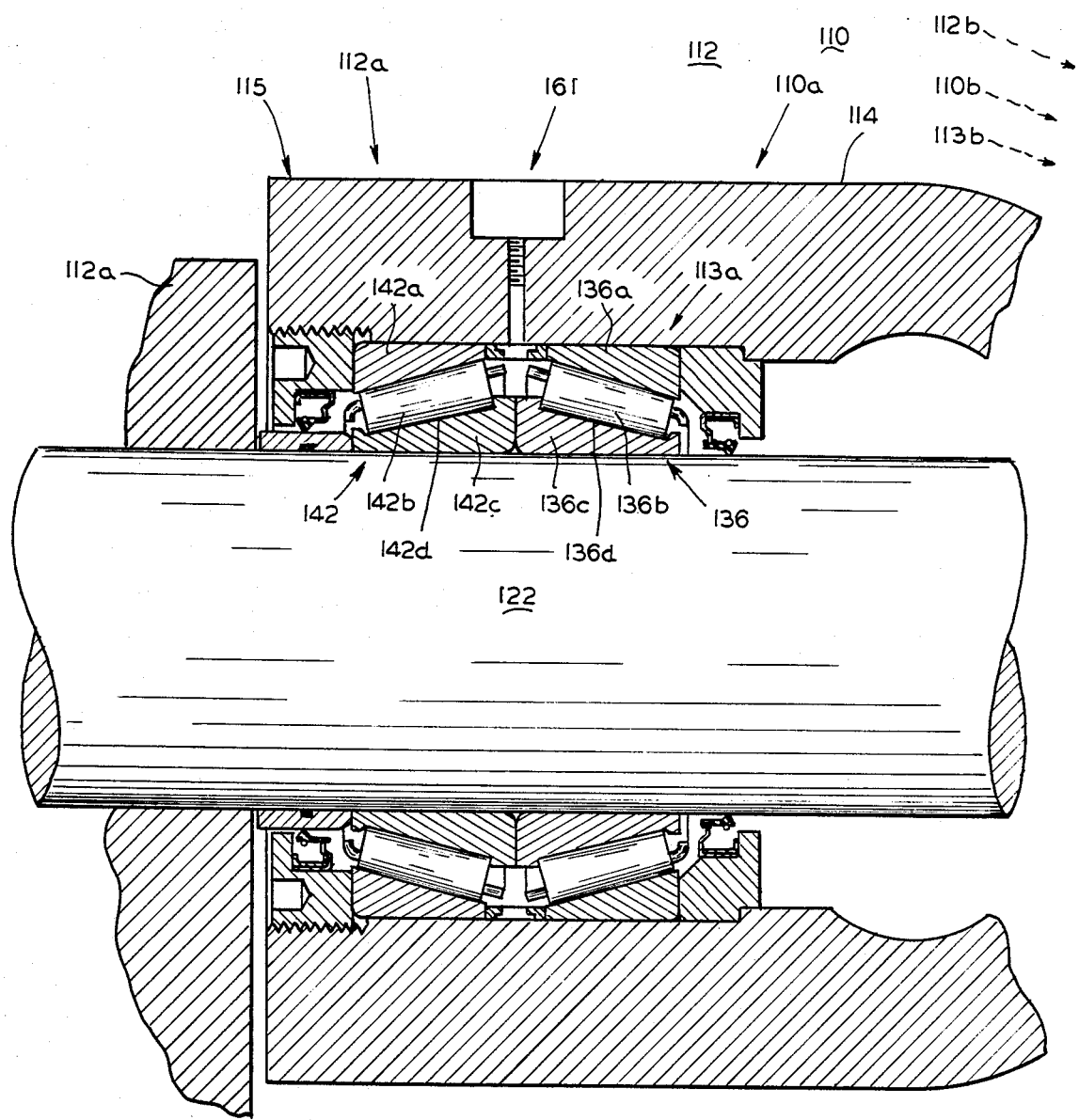
FIG. 2 shows a second embodiment of the invention.

FIG. 2 of the drawing shows another embodiment 115 of the present invention which differs from that of FIG. 1 in that there are two separated parts 110a and 110b to the bearing retainer mechanism 110 which corresponds to bearing retainer mechanism 10 of the first embodiment. The part 110b not shown in FIG. 2 is a mirror image of 110a which is shown in FIG. 2. Structural member 112 is bifurcated and includes separated portions 112a and 112b; 112b does not appear in FIG. 2. Portion 114 corresponds to structural member 14 of FIG. 1 and is long enough to carry the separated parts 110a and 110b of bearing retainer mechanism 110. The pivot pin which is indicated by the numeral 122 in FIG. 2 is longer to provide for the two parts of the bearing retainer mechanism 110a and 110b at the opposite ends of the mechanism 110. Bearing assembly 136 and its component parts 136a, 136b, 136c and 136d, and bearing assembly 142 and its component parts 142a, 142b, 142c and 142d correspond to bearing assemblies 36 and 42 respectively of FIG. 1 and their component parts. Stepped openings 113a and 113b (not shown in FIG. 2) in portion 114 correspond to stepped opening 13 in portion 14 of FIG. 1.

The essence of the present invention is a construction and method for securing or retaining a bearing assembly on one of two pivotally connected structural members, and this disclosure the said one member is either housing 14 of FIG. 1 or housing 114 of FIG. 2. It is also necessary of course to secure the pivot pin to the other structural member.

It is preferred that threads 28a and 48a be American National buttress threads but this invention is not limited to such threads and other types of threads may be utilized in carrying out this invention. Both embodiments of this invention include lubrication openings, 61 and 161 respectively, connecting with spaces between the rows of rollers for admitting lubricant to the bearings.

While we have described and illustrated herein preferred embodiments, and the best mode, shown in FIG. 1, of our invention, it will be understood by those skilled in the art that modifications may be made. For example, it will be appreciated that a single anti-friction bearing may be used in some pivot joints instead of two rows of roller bearings as disclosed herein, and further that the invention is not limited to tapered roller bearings but is useful also for other types of bearings. We intend to cover by the appended claims all such modifications which fall within the true spirit and scope of our invention.

We claim:

1. A method for assembling a pivot joint between a housing and another structural member, the housing having a stepped opening through it including an inwardly projecting flange at one end of the opening, an intermediate diameter section, and a third section at the other end of the opening of larger diameter which is threaded, comprising:
   placing a retainer ring in the opening in abutment with said flange,
   placing a bearing assembly in the opening in contact with said retainer ring,
   threading a threaded continuous annular retainer ring into said larger diameter threaded section of the opening, and
   capturing said bearing assembly between said flange and said threaded retainer ring.

2. A method as in claim 1 which includes the intermediate step of placing a spacer between said bearing assembly and said threaded retainer ring.

3. A method as in claim 1 which includes placing a spacer and a second bearing assembly between said first bearing assembly and said threaded retainer ring.

4. A method as in claim 1 which includes the intermediate steps of placing a first bearing cup in abutment with said retainer ring, installing a first cone assembly having first rollers and a first cone so that said first rollers contact said first bearing cup, placing a spacer in abutment with said first bearing cup, installing a second cone assembly having a second cone and second rollers so that said second cone abuts said first cone, placing a second bearing cup in abutment with said spacer and in contact with said second rollers, and capturing said two bearing cups and said spacer between said threaded retainer ring and said first retainer ring by tightening said threaded retainer ring against said second bearing cup, the said tightening also preloading said bearing portions.

5. A method for assembling a pivot joint between a housing and another structural member, the housing having two stepped openings through it each the same as described for the single opening in claim 1, comprising for each of the two stepped openings respectively,
   placing a retainer ring in the opening in abutment with the flange,
   placing a bearing assembly in the opening in contact with the retainer ring,
   threading a threaded continuous annular retainer ring into said threaded section of the opening, and
   capturing said bearing assembly between said flange and said threaded retainer ring.

6. A method of assembling a pivot joint interconnecting a pair of structural members for pivotal movement about a common axis, one of said structural members comprising two laterally spaced portions, each of said spaced portions having a circular opening therein with the centers thereof aligned along said axis, the other of said structural member located in part between said spaced portions, said other structural member having a stepped circular opening with the center thereof aligned along said axis, said stepped circular opening including an inwardly projecting flange at one end of the stepped opening, an intermediate diameter section, and a third section of larger diameter at the other end of said stepped diameter opening, the method comprising:
   placing a retainer ring in said stepped opening in abutment with said flange,
   placing a first bearing cup in abutment with said retainer ring,
   installing a first cone assembly having first rollers and a first cone so that said first rollers contact said first bearing cup,
   placing a spacer in abutment with said first bearing cup,
   installing a second cone assembly having a second cone and second rollers so that said second cone abuts said first cone,
   placing a second bearing cup in abutment with said spacer and in contact with said second rollers, and
   capturing said two bearing cups and said spacer within said opening between said threaded retainer ring and said flange by tightening said threaded retainer ring against said second bearing cup.

7. A method of assembling a pivot joint interconnecting a pair of structural members for pivotal movement about a common axis, one of said structural members comprising two laterally spaced portions, each of said spaced portions having a circular opening therein with the centers thereof aligned along said axis, the other of said structural members comprising two parts each located in part between said spaced portions, each part of said other structural member having a stepped circular opening with the center thereof aligned along said axis, said stepped circular opening including an inwardly projecting flange at one end of the stepped opening, an intermediate diameter section, and a third section of larger diameter at the other end of said stepped diameter opening, the method comprising for each said part:
   placing a retainer ring in said stepped opening in abutment with said flange, placing a first bearing cup in abutment with said retainer ring, installing a first cone assembly having first rollers and a first cone so that first rollers contact said first bearing cup, placing a spacer in abutment with said first bearing cup, installing a second cone assembly having a second cone and second rollers so that said second cone abuts said first cone, placing a second bearing cup in abutment with said spacer and in contact with said second rollers, and capturing said two bearing cups and said spacer within said opening between said threaded retainer ring and said flange by tightening said threaded retainer ring against said second bearing cup.

8. A method of assembling a pivot joint as in claim 7 in which said two parts of said other structural member are assembled in mirror image of each other.

* * * * *